(12) United States Patent
Vullings

(10) Patent No.: US 9,422,958 B2
(45) Date of Patent: Aug. 23, 2016

(54) SPRUNG LATCH FASTENER

(75) Inventor: Peter Vullings, Palmerston North (NZ)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 334 days.

(21) Appl. No.: 13/583,540

(22) PCT Filed: Jan. 26, 2012

(86) PCT No.: PCT/US2012/022807
§ 371 (c)(1),
(2), (4) Date: Sep. 7, 2012

(87) PCT Pub. No.: WO2013/112166
PCT Pub. Date: Aug. 1, 2013

(65) Prior Publication Data
US 2013/0192038 A1    Aug. 1, 2013

(51) Int. Cl.
*F16B 5/06* (2006.01)
*F16B 21/18* (2006.01)
(Continued)

(52) U.S. Cl.
CPC .............. *F16B 5/0642* (2013.01); *F16B 21/18* (2013.01); *F16B 21/02* (2013.01); *Y10T 29/49817* (2015.01); *Y10T 403/60* (2015.01); *Y10T 403/7005* (2015.01)

(58) Field of Classification Search
CPC ...... F16B 21/082; F16B 21/08; F16B 21/065; F16B 21/06; F16B 21/186; F16B 21/18; F16B 21/02; F16B 5/0642; F16B 2005/06; F16B 2005/0607; F16B 2005/0621; F16B 2005/0671
USPC ........... 292/56, 57, 70, 71, 74, 76, 78, 63, 66, 292/80, 83, 85, 95, 109, 121, 124, 194, 251, 292/340; 24/591.1, 592.1, 593.1, 594.1, 24/706.2, 708.3; 403/348, 326, 329, 22; 29/426.6, 426.5, 525.01, 525.02
See application file for complete search history.

(56) References Cited

U.S. PATENT DOCUMENTS 2,508,662 A * 5/1950 Carper .......................... 292/202
2,543,290 A * 2/1951 Johansson ...................... 279/78
(Continued)

FOREIGN PATENT DOCUMENTS

| CA | 2357102 A1 * | 3/2002 | ............. F16B 21/02 |
|---|---|---|---|
| EP | 2362107 A2 * | 8/2011 | ............. F16B 19/10 |
| WO | WO 2013112166 A2 * | 8/2013 | ............. F16B 21/02 |

OTHER PUBLICATIONS

International Search Report and Written Opinion mailed May 16, 2012 for PCT application serial No. PCT/US12/22807, 13 pages.
(Continued)

*Primary Examiner* — Essama Omgba
(74) *Attorney, Agent, or Firm* — Amin, Turocy & Watson, LLP

(57) ABSTRACT

Fasteners are generally described. In some examples, a fastener can be configured to releasably connect a first member to a second member. The fastener can comprise an element that is able to be arranged with respect to the first member. The element can comprise a latching region that is able to assume a latching orientation. The fastener can also comprise a latch that is able to be arranged with respect to the second member. The latch can comprise a latching portion that is able to latch with the latching region when in the latching orientation to connect the first member to the second member. The fastener can be configured such that the element is movable relative to the latch so that, when moved relative to the latch, the element urges the latching portion out of the latching region to enable disconnection of the first member from the second member.

24 Claims, 6 Drawing Sheets

(51) Int. Cl.
*B23P 19/00* (2006.01)
*F16B 21/02* (2006.01)

(56) References Cited

U.S. PATENT DOCUMENTS

| | | | | |
|---|---|---|---|---|
| 2,641,919 | A * | 6/1953 | Cooper | 70/338 |
| 2,741,225 | A * | 4/1956 | Fink | B43K 24/02 |
| | | | | 401/114 |
| 3,083,274 | A * | 3/1963 | Sparkes | 200/51.09 |
| 3,372,950 | A * | 3/1968 | Wind | 403/326 |
| 3,816,009 | A | 6/1974 | Schenk | |
| 4,898,493 | A * | 2/1990 | Blankenburg | 403/326 |
| 5,076,080 | A | 12/1991 | Fuss et al. | |
| 5,134,870 | A | 8/1992 | Uyeda et al. | |
| 5,289,604 | A * | 3/1994 | Kressner | 15/22.1 |
| 5,330,235 | A * | 7/1994 | Wagner et al. | 285/81 |
| 5,337,100 | A | 8/1994 | Oxford | |
| 5,411,423 | A * | 5/1995 | Higby | 440/83 |
| 5,419,714 | A * | 5/1995 | Nagamine | 439/364 |
| 5,422,487 | A * | 6/1995 | Sauska et al. | 250/436 |
| 6,010,289 | A * | 1/2000 | DiStasio et al. | 411/174 |
| 6,116,807 | A * | 9/2000 | Dzurko et al. | 403/165 |
| 6,237,970 | B1 | 5/2001 | Joannou | |
| 6,321,654 | B1 * | 11/2001 | Robinson | 102/251 |
| 6,494,822 | B1 * | 12/2002 | Hopkins | 483/59 |
| 6,588,809 | B1 * | 7/2003 | Derman | 292/129 |
| 6,641,325 | B2 | 11/2003 | Schwarz | 403/329 |
| 6,679,663 | B2 * | 1/2004 | DiStasio et al. | 411/329 |
| 7,189,043 | B2 * | 3/2007 | Benoit et al. | 411/104 |
| 7,261,341 | B2 * | 8/2007 | Fan | 292/244 |
| 7,405,927 | B2 * | 7/2008 | Lev | 361/679.55 |
| 7,610,783 | B2 | 11/2009 | Rudduck et al. | |
| 7,641,429 | B2 * | 1/2010 | DiStasio et al. | 411/127 |
| 7,976,072 | B2 * | 7/2011 | Parrish | 285/312 |
| 8,087,705 | B2 * | 1/2012 | Littmann et al. | 292/307 R |
| 2002/0039518 | A1 * | 4/2002 | Schwarz | 403/329 |
| 2002/0168244 | A1 * | 11/2002 | DiStasio et al. | 411/299 |
| 2004/0047709 | A1 * | 3/2004 | DiStasio et al. | 411/329 |
| 2005/0100424 | A1 * | 5/2005 | DiStasio et al. | 411/329 |
| 2005/0258330 | A1 * | 11/2005 | Brewster | 248/500 |
| 2006/0071480 | A1 * | 4/2006 | Fan | 292/244 |
| 2008/0083804 | A1 * | 4/2008 | Schlicher | 226/7 |
| 2008/0119297 | A1 * | 5/2008 | Costain | 473/44 |
| 2008/0205974 | A1 * | 8/2008 | DiStasio et al. | 403/22 |
| 2008/0216525 | A1 * | 9/2008 | Parrish | 70/63 |
| 2009/0173225 | A1 * | 7/2009 | Brestovansky et al. | 95/114 |
| 2009/0293239 | A1 | 12/2009 | Stumpfl | |
| 2010/0212119 | A1 | 8/2010 | Dendo | |
| 2010/0248525 | A1 * | 9/2010 | Shaojun | 439/357 |
| 2011/0121560 | A1 * | 5/2011 | Readman | 285/82 |
| 2013/0074296 | A1 * | 3/2013 | Richardson | 24/634 |
| 2014/0286726 | A1 * | 9/2014 | Meese | 411/80.1 |

OTHER PUBLICATIONS

"Mechanical Fasteners," Accessed at http://web.archive.org/web/20120123082343/http://www.globalspec.com/productfinder/mechanical_components/mechanical_fasteners, Accessed on Sep. 20, 2014, pp. 3.

* cited by examiner

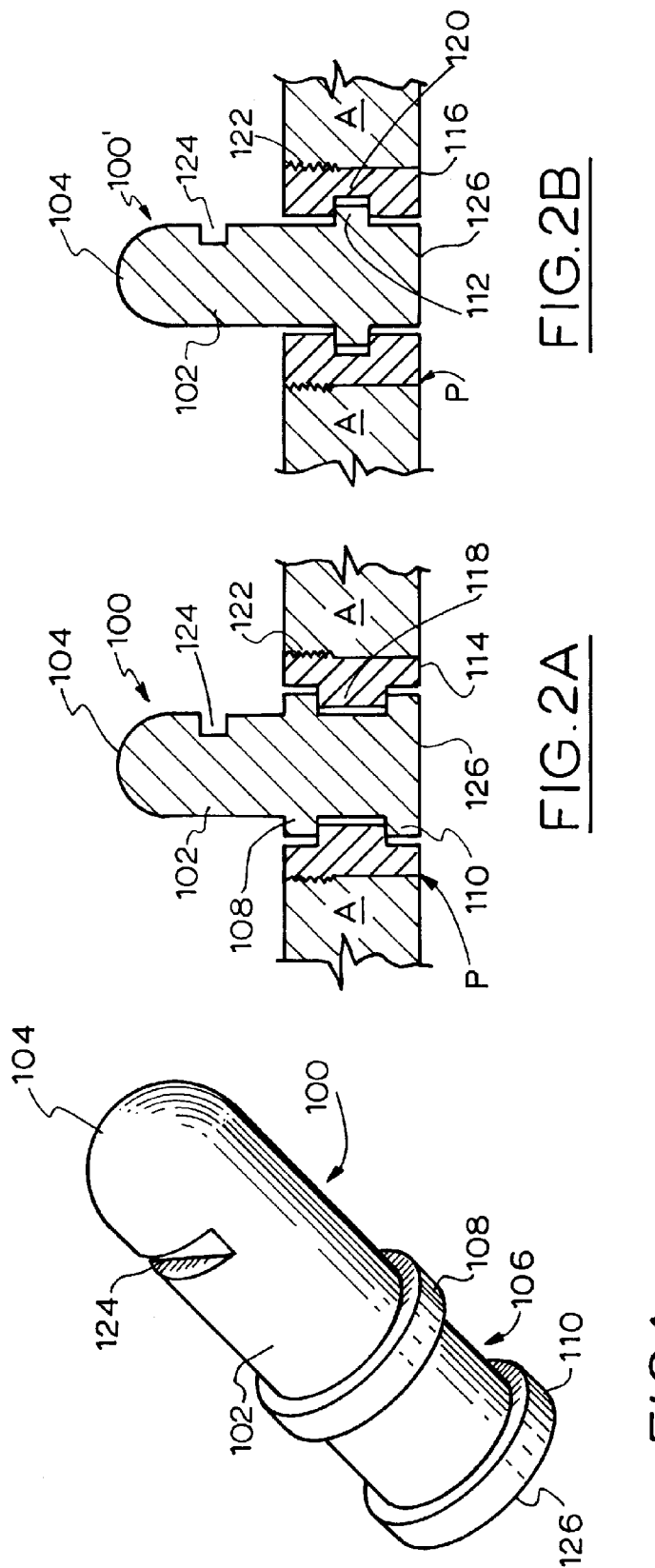

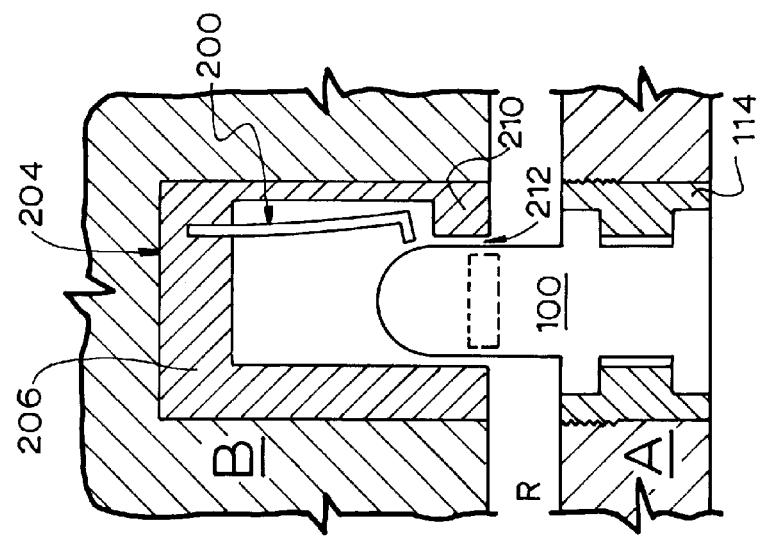
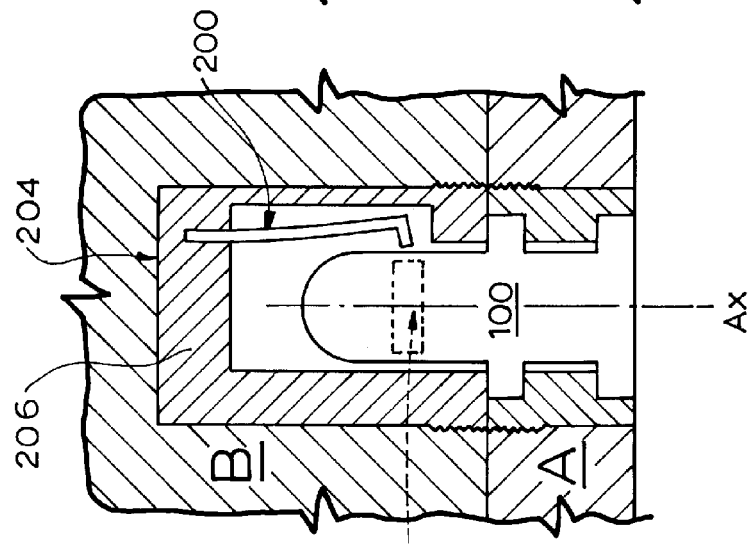
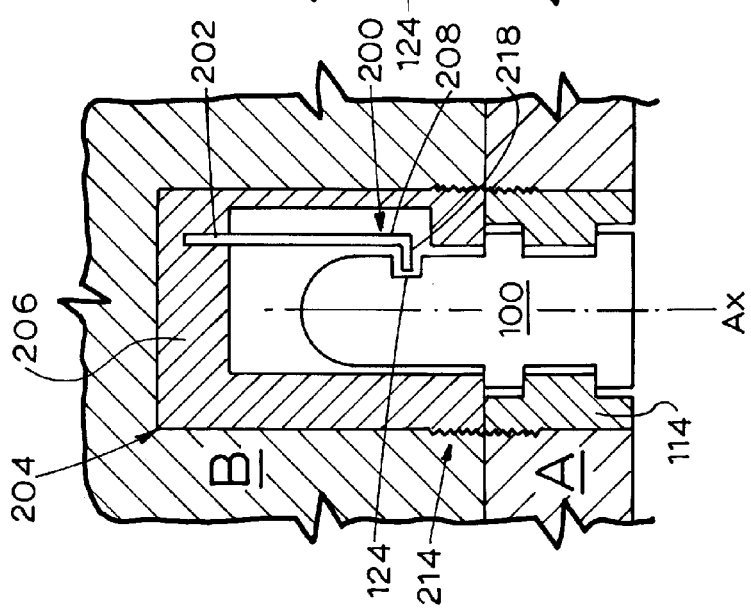

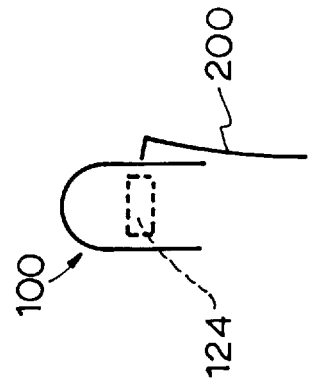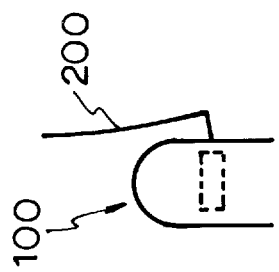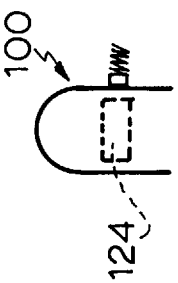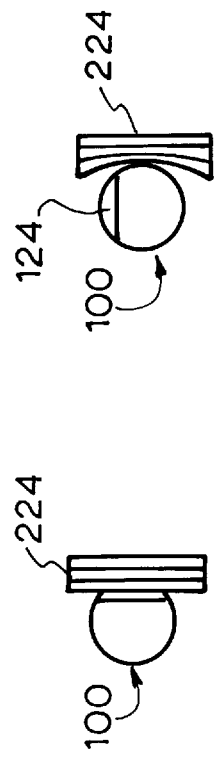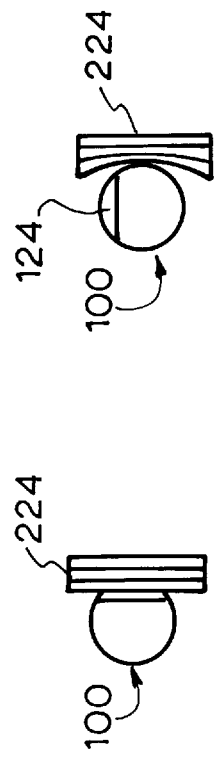

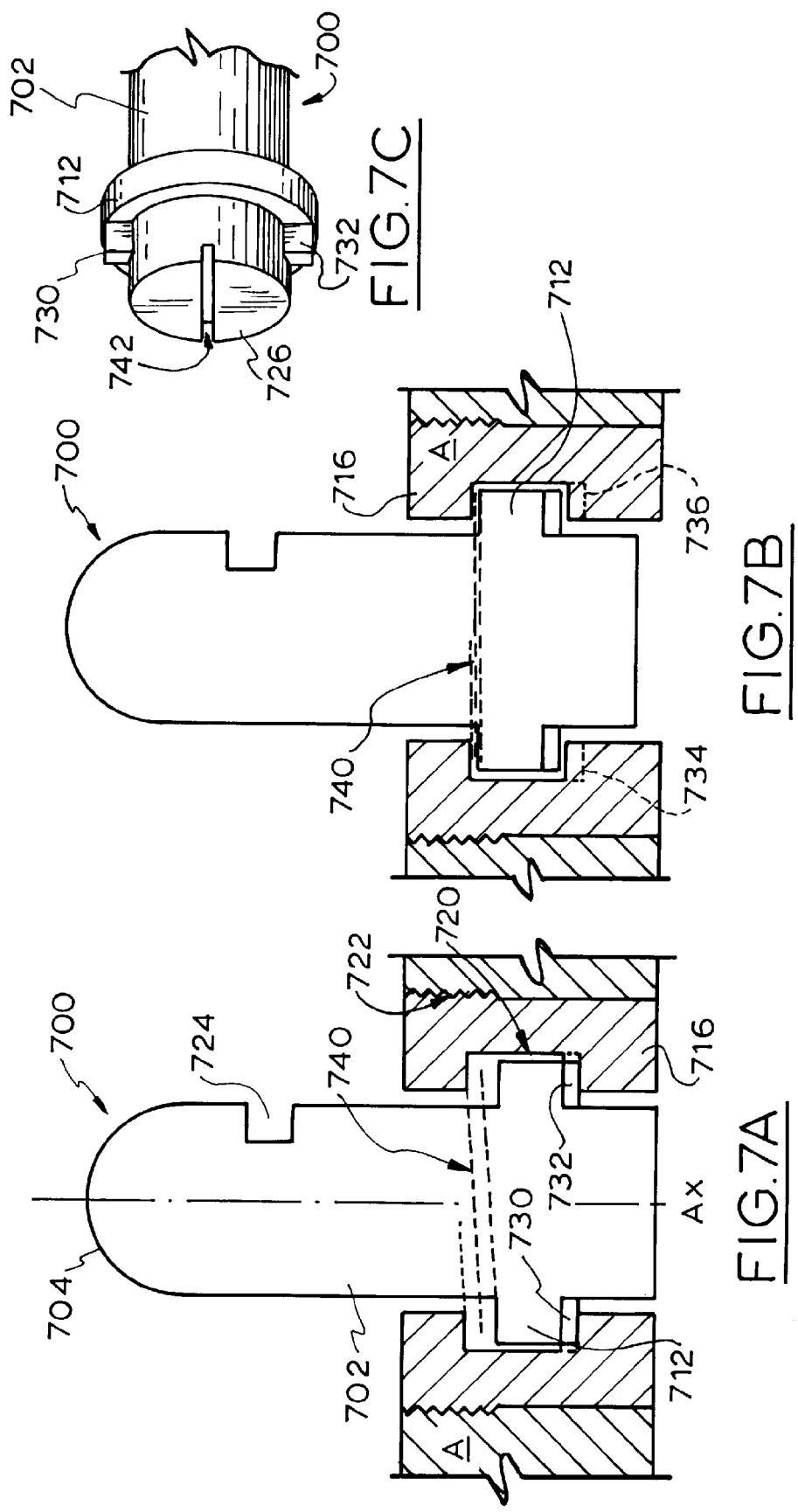

SPRUNG LATCH FASTENER

CROSS REFERENCE TO RELATED APPLICATION

The subject application is a U.S. national stage filing under 35 U.S.C. §371 PCT Application No. PCT/US12/22807, filed Jan. 26, 2012, and entitled "SPRUNG LATCH FASTNER," the disclosure of which is incorporated herein by reference in its entirety.

BACKGROUND

Unless otherwise indicated herein, the materials described in this section are not prior art to the claims in this application and are not admitted to be prior art by inclusion in this section.

In buildings, including in pre-fabricated buildings, components are secured to walls, ceilings, floors, frames, etc using permanent fasteners. In addition, components such as internal walls, cabinetry, shelves, fixtures, fittings, pictures, etc are erected and fastened together on site, and may be uncoupled for internal space reorganization, for alternative use of space, or for deconstruction and removal of the building.

Where permanent fasteners have been employed to fasten such components together this can hinder the uncoupling of components and deconstruction of the building. Also, the components can be damaged during uncoupling, requiring repair or replacement.

SUMMARY

In some embodiments, a fastener is generally described. An example fastener may be configured to releasably connect a first member to a second member. The example fastener may include an element that may be arranged with respect to the first member. The element may include a latching region that is able to assume a latching orientation. The example fastener may also include a latch that may be arranged with respect to the second member. The latch may include a latching portion that is able to latch with the latching region when in the latching orientation to connect the first member to the second member. The element may be movable relative to the latch such that, when moved relative to the latch, the element urges the latching portion out of the latching region to enable disconnection of the first member from the second member.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the drawings:

FIG. 1 shows a diagrammatic perspective view of an element in the form of a bolt that forms part of an example fastener;

FIG. 2A shows a diagrammatic plan view of the bolt of FIG. 1 that is mounted in relation to a first member A;

FIG. 2B shows a diagrammatic plan view of a variation of the bolt of FIG. 1 that is mounted in relation to a first member A;

FIG. 3A shows a diagrammatic plan view of the bolt of FIG. 1 that is mounted in relation to a first member A and latchingly secured with respect to a latch in the form of a spring arm that is mounted in relation to a second member B, to thereby releasably connect first and second members A and B, the bolt and spring arm together forming parts of the example fastener;

FIG. 3B shows a diagrammatic plan view of the spring arm of FIG. 3A being unlatched from the bolt of FIG. 3A;

FIG. 3C shows a diagrammatic plan view of the first member A being disconnected from the second member B, after the spring arm has been detached from the bolt as in FIG. 3B;

FIGS. 5A to 5F respectively show diagrammatic side views pairs, in latched and unlatched configurations, of three different element and latch configurations;

FIGS. 5G and 5H respectively show diagrammatic sectional end views taken through the bolt, in latched and unlatched configurations, of a further element and latch configuration;

FIGS. 7A to 7C respectively show diagrammatic side and perspective views of a differently configured bolt and bolt housing that forms part of another example fastener; all arranged according to at least some embodiments described herein.

DETAILED DESCRIPTION

Figure 4A:
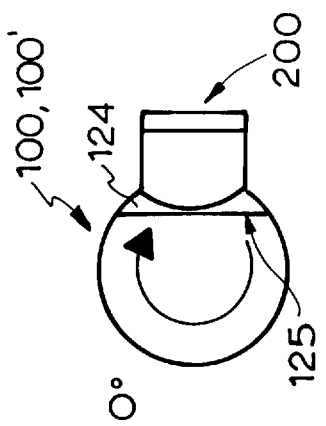
FIGS. 4A to 4D show diagrammatic sectional end views taken through the bolt and spring arm of FIG. 3 to illustrate sequentially the unlatching of the spring arm from the bolt.
Figure 4B:
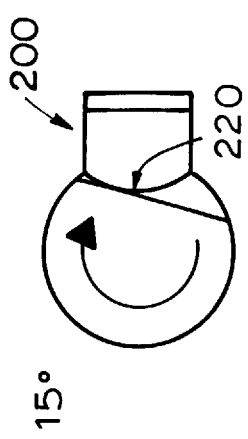
Figure 4C:
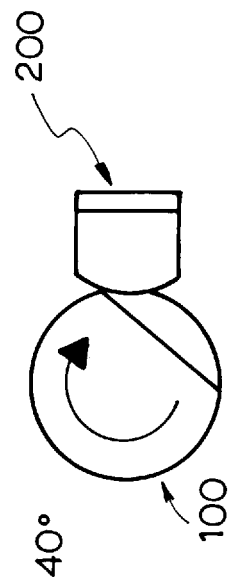

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally directed, inter alia, to methods, apparatus, systems, and members that employ a fastener for releasably connecting first and second members.

Briefly stated a fastener is generally disclosed. An example fastener can releasably connect a first member to a second member. The example fastener may include an element. The element may be arranged (e.g. mounted) with respect to the first member. The element may include a latching region that is able to assume a latching orientation. The example fastener may also include a latch. The latch may be arranged (e.g. mounted) with respect to the second member. The latch may include a latching portion that is able to latch with the latching region when in the latching orientation to connect the first member to the second member. The element may be movable (e.g. rotatable) relative to the latch such that, when moved relative to the latch, the element urges the latching portion out of the latching region to enable disconnection of the first member from the second member.

FIG. 1 is a diagrammatic perspective representation of an element in the form of an example bolt 100 forming part of a first example fastener that is arranged according to at least some embodiments described herein. FIG. 2A shows the example bolt 100 mounted with respect to a first member A.

FIG. 2B shows an example bolt 100', similar in most respects to the bolt 100, and mounted with respect to the first member A. Whilst an elongate bolt is depicted, it may be embodied as another type of projection (e.g. a more squat boss or the like) and not necessarily of elongate form. Where the bolt is fixed against movement with respect to the first member A, the latch may be rotated around the bolt.

The bolt 100, 100' has an elongate shank 102. The shank is configured and curved at its distal end 104 for engagement with a latch and is further configured at its proximal end 106 for mounting with respect to the first member A (FIGS. 2A or 2B). Whilst a curved distal end 104 is shown, the end may be pointed, pyramidal, conical, etc in shape to facilitate bolt insertion, as further explained below.

The bolts 100 and 100' differ only in that the proximal end 106 of the bolt 100 has two spaced circumferential flanges 108, 110 (FIGS. 1 & 2A), whereas the proximal end of the bolt 100' has a single circumferential flange 112 (FIG. 2B). In either case, the flange(s) define a head region of the bolt. The flanges 108, 110 are received within and secure the bolt 100 for rotation with respect to a corresponding housing 114 (FIG. 2A). The single flange 112 is received within and secures the bolt 100' for rotation with respect to a corresponding housing 116 (FIG. 2B). The housings are optional in that the first member A can be directly configured to secure the bolt thereat.

Whilst circumferentially extending flanges are shown in FIGS. 1 and 2, each flange may instead be embodied by one or a series of spaced lugs or pegs projecting out from the shank 102. Alternatively, the bolt retention mechanism may be embodied in the form of mating screw threads, or a bayonet fitting, etc that retain the bolt but allow its rotation.

In this regard, the housing 114 has an annular internally protruding lug 118 for location between the two spaced flanges 108, 110, whereas the housing 116 has an intermediate annular recess 120 for receiving and retaining the flange 112 therein. Each of the housings 114, 116 is externally threaded at 122 for screw mounting with and retention within a suitably sized and internally threaded passage P defined in the first member A. When the bolt 100 or 100' is secured to its respective housing 114 or 116, the shank 102 protrudes beyond the housing (i.e. as shown in each of FIGS. 2A & 2B) to facilitate engagement of the bolt with a latch.

In this regard, the distal end 104 of each bolt 100, 100' is configured for engaging with and enabling latching thereto of a latch when the first member A is being positioned for connection with respect to a second member B (FIG. 3). To facilitate such latching a slot 124 is provided in the distal end 104, with the slot extending transversely across part of the distal end. The slot 124 also defines a flat rear face 125 (FIG. 4). When the bolt 100 or 100' is in a latching orientation, the slot 124 can receive part of a latch therein in use of the fastener, as explained hereafter. Instead of a slot, the distal end can be provided with a groove, ledge, shoulder, rebate, etc.

The bolt 100, 100' is movable by being rotated about an axis $A_x$ (see FIGS. 3A & 3B) relative to its housing 114 or 116 and thus is rotatable with respect to the first member A. As shown in each of FIGS. 2A & 2B, each bolt is retained in its housing such that the proximal end 106 (i.e. at the bolt end face 126) is accessible to enable the bolt to be rotated about its axis. In this regard, the end face 126 can be adapted for engagement by a suitable tool, such as by a hand-held tool (e.g. screwdriver, Allen key, gear, etc) or by a powered drive, etc (see also FIG. 7C in this regard).

Instead of the bolt 100, 100' being rotated with respect to the latch, the latch may be rotated with respect to the bolt (e.g. by facilitating the rotation of a housing for the latch). In addition, whilst a relative rotation is described, a movement other than rotation may be employed to effect the unlatching. For example, the fastener may be reconfigured such that a relative sliding movement between the bolt and latch effects the unlatching.

Referring now to FIGS. 3A to 3C, when the bolt 100 (or it can be the bolt 100') is rotated about the axis $A_x$, the slot 124 moves between a latching orientation (FIG. 3A) and a non-latching orientation (FIGS. 3B & 3C). When the bolt is in the latching orientation the first member A is able to be connected to the second member B (as in FIG. 3A), and when in the non-latching orientation the first member is able to be disconnected from the second member (as in FIGS. 3B & 3C).

Figure 6C:
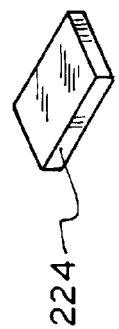
FIGS. 6A to 6C respectively show diagrammatic perspective views of three different latch configurations for use with the respective element configurations of FIGS. 5A to 5D, 5E & 5F and 5G & 5H.

Referring now to FIGS. 3, 4, 5A, 5B and 6C, diagrammatic representations are provided of a first latch embodiment in the form of an example spring arm 200 forming part of the example fastener that is arranged according to at least some embodiments described herein. FIGS. 3A to 3C show the example spring arm 200 mounted with respect to the second member B and variously interacting with the example bolt 100 of FIGS. 1 and 2A (i.e. in FIG. 3A the bolt 100 is in a latching orientation, whereas in FIGS. 3B & 3C the bolt is in a non-latching orientation). FIGS. 4A to 4D show in sequence the example spring arm 200 interacting with the example bolt 100 or 100' of FIGS. 1 and 2, as the bolt is moved from the latching orientation (FIG. 4A) progressively through to the non-latching orientation (FIG. 4D). FIGS. 5A & 5B show the example spring arm 200 interacting with the example bolt 100 or 100', with FIG. 5A showing the interaction in the latching orientation, and FIG. 5B showing the interaction in the non-latching orientation. FIG. 6C diagrammatically depicts the example spring arm 200.

In FIG. 3 a proximal end 202 of the spring arm 200 is shown retained within a latch housing 204. The proximal end 202 can locate interferingly, be crimped, or otherwise be secured in a base wall 206 of the latch housing 204, with a stem 208 of the spring arm 200 protruding into an interior of the housing. The spring arm 200 may alternatively be formed integrally with the latch housing 204. Also, the latch housing is again optional in that the second member B can be configured for directly securing the latch thereto.

The spring arm can alternatively be reconfigured (e.g. such as shown in FIGS. 5C & 5D) such that it projects back into the housing interior from an inwardly protruding shoulder 210 defined adjacent to an opening 212 into the latch housing 204. In a further alternative, the spring arm can be reconfigured such that it projects into the housing interior from a side wall of the latch housing 204. The spring arm 200 may generally locate within the hollow interior of housing 204 behind the shoulder 210.

In each such case, the latch housing 204 is externally threaded at 214 for screw mounting with and retention within a suitably sized and internally threaded recess R defined in the second member B. When so mounted, the opening 212 faces outward with respect to the second member B so that the bolt 100 or 100' can be inserted through the opening and into the interior of latch housing 204 for latching interaction with the spring arm 200.

A distal end 216 of the spring arm 200 has a latching portion in the form of a laterally extending catch 218 extending therefrom. A free end 220 of the catch 218 is curved at its remote edge and is able to be received in the slot 124 when the bolt 100 or 100' is in the latching orientation (FIGS. 3A, 4A and 5A). Much like a leaf-spring, the spring arm 200 is able to flex between its distal end and proximal ends. This enables the bolt 100 or 100' to be inserted through opening 212 and to deflect the spring arm 200 as its curved distal end 104 engages therewith, until the free end 220 of the catch 218 locates in the slot 124. The spring arm 200 flexes back and the bolt 100 is now latched via spring arm 200. Thus, the first member A is connected to the second member B (as in FIG. 3A).

Figure 4D:
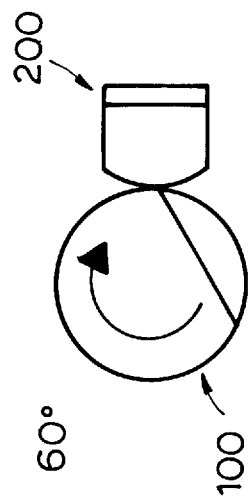

Thereafter, when the bolt 100 (or 100') is rotated about its axis $A_x$ from this latching orientation through to the non-latching orientation, the catch 218 is progressively deflected out of the slot 124 (see especially FIGS. 4A to 4D). As illustrated by FIGS. 4A to 4D the curved edge of free end 220 engages with the flat rear face 125 of slot 124, progressively deflecting the catch 218 out of the slot, until it is fully urged out (FIG. 4D). FIGS. 4A to 4D show that the rotational extent of the bolt 100, 100' to enable it to unlatch can be as little as 60°, though other degrees of rotational extent are possible. A shallow slot can provide for less rotation, but also a lesser degree or extent of latching.

Thus, the bolt is now unlatched from the spring arm (i.e. as shown in FIGS. 3B and 5B or 5D). The bolt 100 (or 100') can now be withdrawn out of the latch housing 204, whereby the first member A is able to be moved away (disconnected) from the second member B (FIG. 3C).

Figure 6B:
Figure 6A:
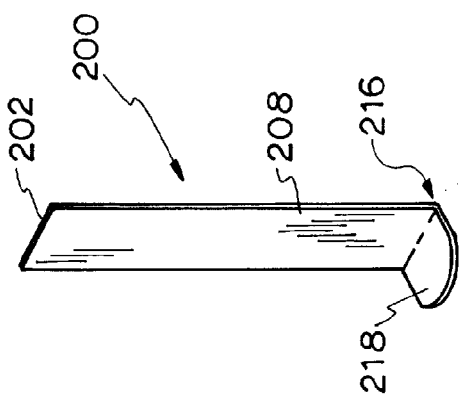

Referring now to FIGS. 5E, 5F and 6B, the latch may instead take the form of a spring-loaded lug 221 that is mounted to extend from a distal end of a helical spring 222. A proximal end of the spring is mounted to the side wall of the latch housing 204. As the bolt is inserted into the latch housing 204 its curved distal end 104 engages with the lug 221, causing spring 222 to compress, until the free end of the lug 221 locates in the slot 124. Thereafter, when the bolt is rotated from the latching orientation through to the non-latching orientation, the helical spring 222 is again able to compress, whereby the lug 221 is progressively deflected out of the slot 124 (again see FIGS. 4A to 4D). Again, this causes the bolt to be unlatched (i.e. as shown in FIG. 5F).

Referring now to FIGS. 5G, 5H and 6C, the latch may alternatively take the form of a resilient block 224 (e.g. of a deformable polymeric rubber). The block 224 has a proximal edge that is mounted with respect to the side wall of the latch housing 204, with its distal edge being retained in the slot 124 when the bolt is in the latching orientation. Again, as the bolt is inserted into the latch housing 204 its curved distal end 104 engages with the block 224, causing it to compressively deform, until the distal edge of the block 224 locates in the slot 124. Thereafter, when the bolt is rotated from the latching orientation through to the non-latching orientation, the block 224 is again able to deform between its distal and proximal edges, whereby it is progressively deflected out of the slot 124. Again, this causes the bolt to be unlatched (i.e. as shown in FIG. 5H).

Referring now to FIGS. 7A to 7C, a modification suitable for each of the bolts 100, 100' is shown in the form of a bolt 700 and a modified bolt housing 716. Similar reference numerals to FIGS. 1 to 6 are employed for similar parts, but using the number series 700, etc. In addition to the features described for each of the bolts 100, 100', the bolt 700 has a projection in the form of two opposing key lugs 730, 732 projecting out from the shank 702 of the bolt 700, adjacent to the flange 712. Whilst two opposing key lugs are shown, a single key lug, or more than two key lugs may also be employed. Differently configured lugs may also be provided (e.g. having triangular profile to locate in a V-notch, etc).

Each key lug 730, 732 is configured to engage with (such as by locating in) a corresponding indentation 734, 736. Each indentation 734, 736 represents a modification of the bolt housing 716, with each indentation being provided in a first of the side walls of a wider annular recess 720 of the bolt housing 716. The location of each indentation 734, 736 is such as to correspond with the bolt being in and having assumed its latching orientation. Thus, when each key lug 730, 732 is located in its corresponding indentation 734, 736 relative rotation of the bolt 700 from its latching orientation to its non-latching orientation is prevented, whereby such rotation is only allowed when each key lug 730, 732 is moved out of (e.g. axially advanced out of) its corresponding indentation 734, 736.

The bolt 700 and bolt housing 716 can be further configured such that, in the latching orientation, the key lugs 730, 732 are biased into their corresponding indentations 734, 736. In this regard, a helical spring 740 can be arranged around the shank 702 of the bolt 700, with one end of the spring 740 facing and urging against a second side wall of the annular recess 720 that opposes the first side wall (i.e. in which the indentations 734, 736 are formed). An opposite end of the spring 740 acts on a side of the flange 712 of the bolt 700.

Thus, when the bolt 700 is in its latching orientation, the spring acts on the flange 712, and causes the key lugs 730, 732 to locate and be maintained within their corresponding indentations 734, 736 thereby locking the bolt 700 against rotation. However, to move the bolt out of its latching orientation and thus to unlatch it from the latch, the bolt 700 must first be axially advanced (i.e. along axis $A_x$), with respect to the bolt housing 716, and against the bias of the spring 740, thereby compressing the spring 740 and lifting each key lug 730, 732 out of its corresponding indentation 734, 736 (see FIG. 7B). Once each key lug 730, 732 is clear of its corresponding indentation 734, 736, the bolt 700 can be rotated about its axis $A_x$ to move to the unlatching orientation and to disengage from the latch.

The advancement and rotation of the bolt 700 can be effected by accessing the bolt end face 726. In the embodiment of FIG. 7, and as shown in FIG. 7C, the end face 726 can be provided with a suitable slot 742 (or the like) for engagement by a suitable tool, such as by a hand-held tool (e.g. screwdriver, Allen key, gear, etc) or by a powered drive, etc.

The modified bolt 700 and modified bolt housing 716 of FIGS. 7A to 7C thereby provide a "fail safe" function to the fastener, in that the bolt is maintained "locked" by spring 740 when in its latching configuration in use, unless it is advanced out of the locked and latching configuration and then rotated by a suitable tool.

The example fasteners described with reference to FIGS. 1 to 7 may be employed to secure a first member A to second member B. Each member may take the form of a component such as a wall, ceiling, floor, door, shelf, fixture, cabinetry, furniture item, wall mounting, fixture, fitting, etc.

The example fasteners may in turn allow for other items (e.g. fittings, furnishings, etc) to be secured to the first member A. Such components A and B may be found in, for example, originally constructed (e.g. built from the ground up) and prefabricated buildings Like and unlike components A and B may be fastened together using the example fasteners.

It should be appreciated that the example fasteners of FIGS. 1 to 7 are not limited to use with components in buildings, and may be used to secure to and to secure together a range of different components in furniture, cabinetry, vehicles, installations, machinery, etc.

The example fasteners of FIGS. 1 to 7 may be supplied in a prior-attached configuration to a given member (e.g. before it is used in the building or construction). Other components may then be mounted on site to the pre-attached fasteners.

Each of the components of the example fasteners of FIGS. 1 to 7 may be fabricated of any suitable material, such as plastic, steel, aluminium, timber, etc. Suitable combinations of these materials may be employed. The material selected for a given part of the fastener may relate to the size, purpose and required strength/durability of the example fasteners.

The example fasteners of FIGS. 1 to 7 may be non-permanent, self-locating, activated manually, mechanically/electrically (e.g. by use of an electrically powered tool), are simple in design and can be made of a variety of materials depending on the application.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). Further, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a fastener having at least one of A, B, and C" would include but not be limited to fasteners that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a fastener having at least one of A, B, or C" would include but not be limited to fasteners that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into sub-ranges as discussed above. Finally, as will be understood by one skilled in the art, a range includes each individual member.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods which can, of course, vary. It is also to be understood that the terminology used herein is for the purpose of describing particular embodiments only, and is not intended to be limiting.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:
1. A fastener, comprising:
an element that is mounted to a first member releasably connectable to a second member, the element comprising a latching region that is able to be oriented according to a latching orientation; and
a latch that comprises a first portion that is fixed to a wall of a latch housing formed by the second member and a second portion that is moveable within the latch housing formed by the second member, the latch comprising a latching portion that is able to latch with the latching region when oriented according to the latching orientation to connect the first member to the second member, wherein, in response to rotation of the element relative to the second portion of the latch that is moveable within the latch housing, the element urges the latching portion out of the latching region to facilitate disconnection of the second member from the first member that is mounted to the element, and the latching region moves between the latching orientation and a non-latching ori- entation in which the second member is able to be disconnected from the first member that is mounted to the element, and wherein the element is elongate, with an axis relative to the first member defining a longitudinal axis of the element, and a surface of the element associated with the first member comprises a portion for engagement with another element to facilitate the rotation.

2. The fastener of claim 1, wherein a distal end of a first part of the element is configured to engage with and deflect the latch as the first member is being positioned for connection with the second member.

3. The fastener of claim 1, wherein the latching region comprises a groove, ledge, shoulder or rebate formed to extend transversely across a first part of the element, and into or behind which the latching portion becomes located when in the latching orientation.

4. The fastener of claim 1, wherein a second part of the element is configured to be retained by and to rotate within an element housing that is able to be arranged within the first member.

5. The fastener of claim 4, wherein the element comprises a bolt having a head with at least one flange that is configured to be retained by and to rotate within the element housing, with a shank of the bolt protruding beyond the element housing to facilitate engagement with the latch.

6. The fastener of claim 4, wherein the element further comprises at least one projection able to engage with a corresponding part of the element housing when the element is in the latching orientation, wherein the movement of the element to the non-latching orientation is inhibited, and wherein the element is movable relative to the second portion of the latch when the at least one projection is first disengaged from the corresponding part of the element housing.

7. The fastener of claim 6, wherein the element is configured to be biased with a bias to cause the at least one projection to engage with the corresponding part of the element housing when the element is in the latching orientation, and wherein disengagement of the at least one projection from the corresponding part of the element housing is effected by advancement of the element with respect to the element housing against the bias.

8. The fastener of claim 1, wherein a proximal end of the element is accessible to facilitate rotation of the element about the axis.

9. A fastener, comprising:
an element that is mounted to a first member releasably connectable to a second member, the element comprising a latching region that is able to be oriented according to a latching orientation; and
a latch that comprises a first portion that is fixed to a wall of a latch housing formed by the second member and a second portion that is moveable within the latch housing formed by the second member, the latch comprising a latching portion that is able to latch with the latching region when oriented according to the latching orientation to connect the first member to the second member,
wherein, in response to rotation of the element relative to the second portion of the latch that is moveable within the latch housing, the element urges the latching portion out of the latching region to facilitate disconnection of the second member from the first member that is mounted to the element, wherein the second portion of the latch is entirely retained within the latch housing when the latching portion is oriented according to the latching orientation, wherein the latch housing comprises an opening that opens to a hollow interior of the latch housing, wherein the opening is defined in part by an adjacent shoulder located at the opening, and wherein the latch is located within the hollow interior and generally behind the shoulder.

10. The fastener of claim 9, wherein the first portion of the latch is fixed to the latch housing at a rear wall of the latch housing or a side wall of the latch housing to extend from the latch housing and into the hollow interior of the latch housing.

11. The fastener of claim 9, wherein:
the first portion of the latch is mounted to extend laterally from a distal end of a latch mounting member, wherein the latch mounting member is mounted at a proximal end of the latch mounting member to a rear wall of the latch housing,
the latch is a spring, wherein the spring is mounted at a proximal end of the spring a side wall of the latch housing, or
the latch is defined by a resilient member, with a distal edge of the resilient member being arranged to latch with the latching region, and with a proximal edge of the resilient member being mounted to a side wall of the latch housing.

12. The fastener of claim 11, wherein, when the latching portion is latched with the latching region, and when the element is progressively rotated relative to the second portion of the latch, a portion of the latching region deflects the latching portion laterally and progressively out of the latching region.

13. The fastener of claim 12, wherein, as the latching portion is deflected laterally and progressively out of the latching region,
the latch mounting member is able to flex between the distal end of the latch mounting member and the proximal end of the latch mounting member; or
the spring is able to compress; or
the resilient member is able to deform between the distal edge of the resilient member and a proximal edge of the resilient member.

14. A first member releasably connectable to a second member, comprising:
an element that is attached to the first member, wherein the element comprises a latching region that is able to be oriented according to a latching orientation, the element attached to the first member is releasably connectable to the second member via a latch, a first portion of the latch is fixed to a wall of a latch housing formed by the second member, a second portion of the latch is moveable within the latch housing formed by the second member, the latch is retained within a hollow interior of the latch housing and behind a shoulder located at an opening of the latch housing that opens to the hollow interior, the opening is defined in part by the shoulder, and, in response to rotation of the element relative to the second portion of the latch that is moveable within the latch housing, the latch is forced out of the latching region and the second member is disconnected from the first member that is attached to the element.

15. The first member of claim 14, wherein a housing for the element is mounted within or is formed by a recess preformed in the first member.

16. The first member of claim 15, wherein the first member comprises a wall or a panel through which the recess extends, and wherein, when the element is mounted to the first member, a proximal end of the element is accessible.

17. A second member releasably connectable to a first member, comprising:

a latch able to be arranged with respect to the second member, the latch comprising a latching portion that is able to latch with a latching region when oriented according to a latching orientation to connect the second member to the first member, wherein a first portion of the latch is mounted to extend from a wall of a latch housing formed by the second member, a second portion of the latch is moveable within the latch housing formed by the second member, the latch is located within a hollow interior of the latch housing and behind a shoulder located at an opening of the latch housing that opens to the hollow interior, the opening is defined in part by the shoulder, and the latch is disconnected from the latching region in response to rotation of the first member with respect to the second portion of the latch that is moveable within the latch housing.

18. The second member of claim 17, wherein the latch housing is formed by a recess preformed in the second member.

19. A fastener system, comprising:
   a fastener including:
      an element that is joined to a first member releasably connectable to a second member, the element comprising a latching region that is able to be oriented according to a latching orientation; and
      a latch that comprises a fixed portion that is mounted to extend from a wall of a latch housing formed by the second member, a moveable portion that is moveable within the latch housing formed by the second member, and a latching portion that is able to latch with the latching region when oriented according to the latching orientation to connect the first member to the second member, wherein the latch is retained within a hollow interior of the latch housing and generally behind a shoulder located at an opening of the latch housing that opens to the hollow interior, wherein the opening is defined in part by the shoulder, and wherein, in response to rotation of the element relative to the moveable portion of the latch that forces the latching portion out of the latching region, the second member is disconnected from the first member that is joined to the element;
   the first member to which the element is able to be mounted; and
   the second member to which the latch is able to be mounted.

20. The fastener system of claim 19, wherein the fastener and the latch are respectively mounted to the first and second members during fabrication of the first and second members.

21. A method to releasably connect a first member to a second member using a fastener, comprising:
   positioning the first member in relation to the second member including latching a latching portion of a latch that is able to latch with a latching region when oriented according to a latching orientation to connect the first member to the second member,
   wherein the fastener comprises an element that is secured to the first member, the element comprising the latching region, wherein the latch is retained within a hollow interior of a latch housing formed by the second member and behind a shoulder located at an opening of the latch housing that opens to the hollow interior, wherein the opening is defined in part by the shoulder, and wherein the latch comprises a fixed portion that extends from a wall of a latch enclosure formed by the second member, and a moveable portion that is moveable within the latch enclosure formed by the second member; and
   in response to rotation of the element relative to the moveable portion of the latch, operating the element to urge the latching portion out of the latching region to facilitate disconnection of the second member from the first member that is secured to the element.

22. The method of claim 21, wherein the element is moved relative to the latch, and wherein the latching region orients according to the latching orientation prior to or after the positioning the first member in relation to the second member.

23. The method of claim 21 wherein, when the latching portion is latched with the latching region, to disconnect the first member from the second member, the element is rotated relative to the moveable portion of the latch to urge the latching portion out of the latching region, and at least one of the first member or the second member is moved away from the other.

24. An apparatus, comprising:
   element means for facilitating a releasable connection of a first member to a second member, the element means comprising a latching region for orientating according to a latching orientation; and
   latch means for moving with respect to the second member, the latch means comprising a latching portion for latching with the latching region when in the latching orientation to form the releasable connection of the first member to the second member,
   wherein the latching portion is associated with a latch that is fixed to extend from a wall of a latch housing formed by the second member,
   wherein the latch is contained within a hollow interior of the latch housing and generally behind a shoulder located at an opening of the latch housing that opens to the hollow interior, and the opening is defined in part by the shoulder, and
   wherein, in response to rotation of the element means relative to a moveable portion of the latch means, the element means urges the latching portion out of the latching region for disconnecting the first member from the second member.

* * * * *